Patented Jan. 2, 1951

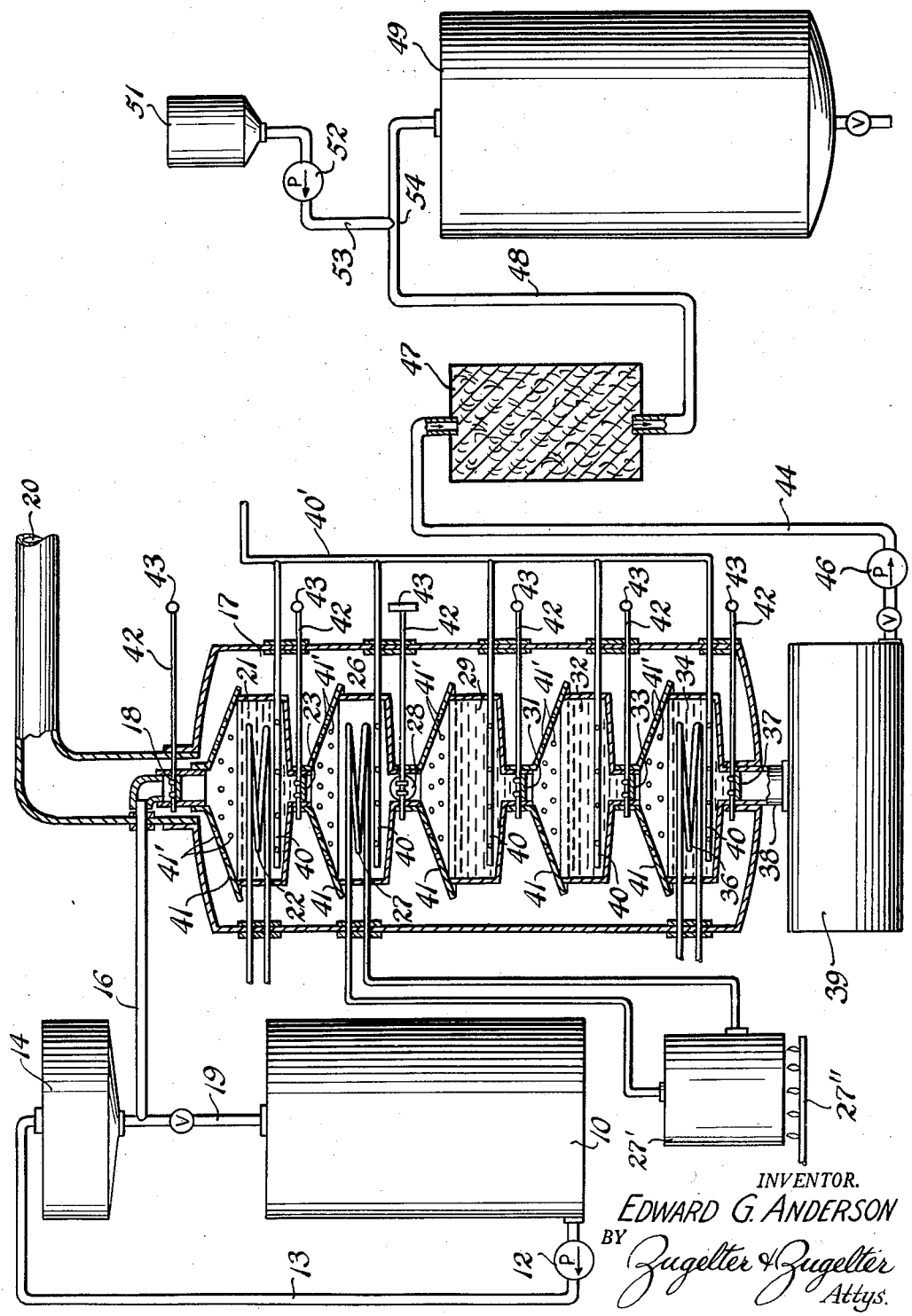

2,536,865

UNITED STATES PATENT OFFICE 2,536,865

SHORTENING AND METHOD OF MAKING SHORTENING

Edward G. Anderson, Hamilton County, Ohio, assignor to The E. Kahn's Sons Company, Cincinnati, Ohio, a corporation of Ohio Application January 25, 1949, Serial No. 72,563

16 Claims. (Cl. 99—118)

This invention relates to shortening and to a method of making shortening. More particularly, this invention relates to an improved, substantially odorless bland shortening of high smoke point manufactured from lard and tallow, and to a method of making a bland shortening.

Lard, tallow, and mixtures of lard and tallow normally have a relatively low smoke point, and an object of this invention is to produce shortening from lard and tallow which has a high smoke point.

A further object of this invention is to produce shortening from lard and tallow which is substantially free from odor-bearing materials and free fatty acids.

A further object of this invention is to produce a shortening from animal fat such as lard and tallow which has a smoke point of substantially 465 degrees F.

A further object of this invention is to provide a method for preparing a shortening having a smoke point of substantially 465 degrees F. from lard and tallow.

Naturally occurring lard and tallow contain not only odor-bearing materials but also materials which can absorb the odors and flavors of one material fried therein and transmit the odors and flavors to other materials subsequently fried therein, and a further object of this invention is to produce a shortening from lard and tallow which does not carry or transmit the flavor or odor of one material fried therein to other materials subsequently fried therein.

The above and other objects are attained by the means described herein and disclosed more fully in the accompanying drawing, in which:

The drawing is a schematic view of apparatus for producing shortening in accordance with the present invention.

In the drawing and description, like reference characters have been used to indicate like parts.

Briefly, the present invention is based on the discovery that lard, tallow and mixtures of animal fats containing lard and tallow can be heated to temperatures in the neighborhood of 475 degrees F. if the heating is carried out in a high vacuum and that when lard is heated to such temperatures and agitated, as with steam, odor and flavor-bearing materials and free fatty acids may be removed from the lard to produce a bland shortening having a smoke point of about 465 degrees F. This shortening has been found not to carry odor or taste from one food fried therein to other foods subsequently fried therein or from one food to another when several foods are simultaneously cooked therein. The precise nature of the materials which carry odors and flavors from one food fried in fat to another food fried at the same time or subsequently therein is not known and these materials will be referred to herein as odor and flavor "carriers."

A mixture containing a major portion of prime steam lard and lesser proportions of edible beef tallow and lard flakes forms the raw material from which the shortening of this invention is manufactured. This raw material may include from 15% to 25% edible beef tallow and about 6½% to 7½% lard flakes the rest being prime steam lard, all percentages being by weight.

The preferred batch or starting material from which my improved shortening is made contains about 20% edible beef tallow, from 6½% to 7½% lard flakes and the reminder steam lard. The tallow has the property of imparting creaming power to the finished product and to a minor extent adds to the stiffness thereof. The lard flakes are employed primarily to increase the melting point and impart stiffness. The proportion of lard flakes may be varied with the season of the year, about 7½% being employed during hot summer weather to increase the stiffness, while only about 6½% lard flakes are needed during cold winter weather.

In the drawing, apparatus for heating the raw material to an appropriate temperature in the neighborhood of 475 degrees F. under a vacuum is shown schematically. In the drawing, a raw material or batch storage tank is indicated at 10. In storage tank 10, the mixed raw materials may be held at a temperature of about 140 degrees F., which is just sufficient to maintain the contents of storage tank 10 in a liquid condition. The raw material may be bleached and filtered in the usual manner before reaching storage tank 10.

From tank 10, the raw material is pumped by pump 12 through line 13 to a measuring tank 14, in which a batch of raw material is measured. As will be understood, appropriate float operated mechanism or the like in measuring tank 14 may start the operation of pump 12 automatically when the measuring tank is ready to be filled and stop the pump when the tank has been filled. From measuring tank 14, the batch passes through a line 16 into the top of a tray tower 17 where the batch is heated. A valve 18 in line 16 is opened at appropriate intervals to permit entrance of a batch into tower 17. A valve-controlled return line 19 may run between measuring tank 14 and storage tank 10 to permit draining of tank 14 when desired.

Tray tower 17 is substantially vacuum-tight. A vacuum line 20 is connected to the top of tower 17 and impresses a vacuum, which may be of about 6 mm. of mercury, on the entire contents of the tower so that during heating the batch is constantly under a vacuum. The vacuum may be maintained by means of steam jet evactors of commercial design, the principle of operation of which is well known. An explanation of the operation thereof can be found in the patent to Markson, No. 2,208,947.

As the batch enters tower 17 through line 16, it falls on uppermost tray 21 where it is heated by steam coils 22 to a temperature of about 355 degrees F. When the batch has entered the tower, valve 18 may be closed so that another batch may be introduced into and measured in measuring tank 14 while the first batch is being heated in tray 21. When the first batch has been heated in tray 21, a valve 23 at the bottom of tray 21 opens, and the batch discharges into a second heating tray 26 where it is further heated to a temperature of about 475 degrees F. by coils 27 which carry an appropriate heat transfer fluid. The heat transfer fluid may be a material having low vapor pressure at high temperature such as "Dowtherm," a biphenyl compound. The heat transfer fluid may be heated in a boiler 27' which may be supplied with heat by a suitable heating element here shown as a ring burner 27''. When the batch has passed from uppermost tray 21 to second heating tray 26 valve 23 is closed, and a second batch may be measured and introduced into uppermost tray 21.

From second heating tray 26, the batch is discharged by valve 28 into an upper deodorizing tray 29 where it cools slowly to a temperature of about 450 degrees F. while being agitated with steam. Then a valve 31 opens to release the batch to a second deodorizing tray 32 where the batch cools slowly to about 425 degrees F. while being agitated with steam. The batch remains in trays 26, 29, and 32 for a sufficient time for removal of substantially all free fatty acids and other odor and flavor bearing materials and also substantially all the odor and flavor carriers. Then a valve 33 at the bottom of tray 32 opens to permit the batch to pass to a cooling tray 34. Cooling water coils 36 in tray 34 cool the batch to a temperature of about 150 degrees F. The flow of water in the cooling coils 36 may be regulated by an appropriate thermostat (not shown) so that the flow of cooling water is halted when the temperature of the batch in cooling tray 34 reaches about 150 degrees F., at which temperature the batch is freely fluid but need no longer be held under a vacuum. Finally, when the batch has been cooled, a valve 37 in a tower discharge line 38 may be opened to discharge the batch from the tower to a drop tank 39. A perforated steam line or coil 40 is located near the bottom of each tray and introduces steam into the contents of each tray to agitate the contents and aid in stripping free fatty acids and other flavor and odor bearing materials and carriers of odors and flavors from the contents of each tray. All the steam coils 40 may be attached to a single steam main 40'.

The batch remains in each tray of the tower for the same length of time as it remains in every other tray. Best results have been obtained at the temperatures indicated where the batch stays in each tray of the tower for approximately thirty minutes. In addition, about two and one-half minutes may be allowed to permit the batch to move from each tray to the next. The steam introduced through coils 40 may be at a moderate pressure, for example 40 pounds per square inch gauge pressure. The steam may be saturated as it enters each tray having a temperature of about 287 degrees F., and the steam is superheated as it passes through the liquid fat or oil in the trays. This steam serves to agitate the contents of the trays and further acts to strip free fatty acids and other odor and flavor bearing materials and carriers for odors and flavors from the fat. The coils may be constructed so that a greater amount of steam is introduced into trays 29 and 32, in which the major proportion of the deodorizing takes place, than into the other trays. Where each batch consists of 2000 pounds (one short ton) and remains in each tray for 30 minutes, approximately 60 pounds of steam may be introduced into each of trays 29 and 32 while approximately 20 pounds of steam may be introduced into each of trays 21, 26, and 34 during the 30 minutes that the batch remains in each tray.

Tray 21 serves chiefly as a de-aerating and preliminary heating tray. In tray 21, substantially all the air which may be entrained in entering fat is stripped from the fat. In tray 26, the fat is heated to its maximum temperature, and some of the free fatty acids, odor bearing materials, and carriers for flavors and odors are stripped from the fat in tray 26. In main deodorizing trays 29 and 32, the major portion of the stripping steam is introduced; and, while the fat is held at a temperature of over 425 degrees F., the stripping steam serves to strip from the fat substantially all the free fatty acids and other odor bearing materials together with odor and flavor carrying materials. Tray 34 serves for cooling the fat to storage temperatures at which it can be stored under atmospheric pressure as vacuum conditions are not needed.

The coils and trays of the tower are preferably made from a material which is not subject to oxidation or attack by the fat and free fatty acids in the tower and which has no deleterious effect on the fat. Nickel has been found to be a suitable material.

Each of the trays may be equipped with a cover 41. Covers 41 each contain a plurality of perforations 41' so that the contents of each tray are subjected to the vacuum. The covers 41 serve as baffles to prevent fat splashing from the trays as the trays are filled and while stripping steam agitates the contents of each tray.

Each of the valves in tower 17 may be of a butterfly type, and, as shown, each valve may be equipped with a stem 42 attached to the disc of the valve. The valve stems may extend through appropriate vacuum-tight packing boxes in the wall of tower 17. An operating handle 43 may be attached to each stem for turning the stem. When the tower is filled and in continuous operation, the valves are opened and closed in order starting from the bottom of the tower. Thus, when a first batch has occupied tray 34 for thirty minutes, valve 37 is opened to discharge the batch into drop tank 39. When the batch has been discharged, valve 37 is closed and valve 33 may be opened to discharge the next following or second batch from tray 32 to tray 34. When the second batch has been discharged to tray 34, valve 33 closes and valve 31 may be opened to discharge a third batch from tray 29 to tray 32.

Next, valve 31 is closed and valve 28 may be opened to permit a fourth batch to be discharged from tray 26 to tray 29, and thereafter in order valve 28 is closed and valve 23 is opened to discharge a fifth batch from tray 21 to tray 26. Finally, valve 23 is closed and valve 18 is opened to permit a sixth batch to pass from measuring tank 14 to tray 21. Valve 18 may be controlled for closing by float means (not shown) in tank 14 so that when the sixth batch has been measured, valve 18 is closed. When the sixth batch has been introduced into tray 21 and valve 18 has closed, the cycle is completed and valve 37 below cooling tray 34 can open to start the next cycle. As will be understood, an appropriate timing mechanism may be associated with the valve stems and handles for automatic control of operation of the tower.

The batch may be removed from drop tank 39 through a valve controlled line 44. A pump 46 in line 44 serves to pump the batch from the drop tank to a filter 47. From filter 47, the batch passes through a line 48 to a product storage tank 49. As the batch passes through line 48, a minor proportion of an anti-oxidant may be added to reduce the tendency of the shortening to become rancid. The anti-oxidant is pumped from an anti-oxidant storage tank 51 by a metering pump 52 through a line 53 which meets line 48 at a T-connection 54. The anti-oxidant is introduced into the batch through the T-connection 54, and mixes with it as the batch passes through line 48 to the storage tank.

The anti-oxidant may be of a conventional type such as mixture of a propylgallate type anti-oxidant and citric acid carried in a vehicle of lecithin and corn oil, or the like and may be added in the usual proportion required to inhibit oxidation of lard, tallow and other fats.

During the heating, free fatty acids and other odor and flavor bearing materials in the raw material batch are removed to leave a bland residual shortening having a very high smoke point in the neighborhood of 465 degrees F. The temperatures and times of heating may be varied. Shortening can be produced which is substantially free of odor and flavor bearing materials, carriers for odors and flavors, and free fatty acids from lard, tallow and mixtures containing lard and tallow by heating to a maximum temperature in the range between 440 degrees F. and 485 degrees F. in the second tray or stage of the process. If the fat is heated to substantially higher temperatures, a substantial amount or proportion of neutral fat may be lost through distillation of the fat, and the temperature should not be raised to the point where substantial amounts of neutral fat are lost. If the temperature in the second stage is lowered, the time of heating in that stage and in deodorizing trays 29 and 32 should be increased, and if the temperature in the second stage is increased, it may be possible to shorten the time of heating in that and other stages.

Having described my invention what I claim as novel and desire to secure by Letters Patent is:

1. A process for preparing shortening which comprises heating a mixture including a major proportion of steam lard and minor proportions of edible beef tallow and lard flakes to a temperature between 440 degrees F. and 485 degrees F. in a vacuum, holding the mixture at a temperature above 425 degrees F. while agitating with steam for a sufficient time to cause removal of substantially all free fatty acids, odor-bearing materials, and carriers for food odors and flavors, and then cooling the mixture while maintaining the vacuum.

2. A process for preparing shortening which comprises heating a mixture including 15% to 25% edible beef tallow and from 6½% to 7½% lard flakes, the rest being substantially all steam lard, all percentages being by weight to a temperature between 440 degrees F. and 485 degrees F. in a vacuum, holding the mixture at a temperature above 425 degrees F. while agitating with steam for a sufficient time to cause removal of substantially all free fatty acids, odor bearing materials, and carriers for food odors and flavors, and then cooling the mixture while maintaining the vacuum.

3. A process for preparing shortening which comprises heating a mixture including substantially 20% edible beef tallow and 6½% to 7½% lard flakes, the rest being substantially all steam lard, all percentages being by weight to a temperature between 440 degrees F. and 485 degrees F. in a vacuum, holding the mixture at a temperature above 425 degrees F. while agitating with steam for a sufficient time to cause removal of substantially all free fatty acids, odor bearing materials, and carriers for food odors and flavors, and then cooling the mixture while maintaining the vacuum.

4. A process for preparing shortening which comprises heating a mixture including a major proportion of steam lard and minor proportions of edible beef tallow and lard flakes to a temperature of approximately 475 degrees F. in a vacuum, holding the mixture at a temperature above 425 degrees F. while agitating with steam for a sufficient time to cause removal of substantially all free fatty acids, odor-bearing materials, and carriers for food odors and flavors, and then cooling the mixture while maintaining the vacuum.

5. A process for preparing shortening which comprises heating a mixture which includes from 15% to 25% edible beef tallow and from 6½% to 7½% lard flakes, the rest being substantially all steam lard, all percentages being by weight, to a temperature of approximately 475 degrees F. in a vacuum, holding the mixture at a temperature above 425 degrees F. while agitating with steam for a sufficient time to cause removal of substantially all free fatty acids, odor bearing materials, and carriers for food odors and flavors, and then cooling the mixture while maintaining the vacuum.

6. A process for preparing shortening which comprises heating a mixture which includes substantially 20% edible beef tallow and 6½% to 7½% lard flakes, the rest being substantially all steam lard, all percentages being by weight, to a temperature of approximately 475 degrees F. in a vacuum, holding the mixture at a temperature above 425 degrees F. while agitating with steam for a sufficient time to cause removal of substantially all free fatty acids, odor bearing materials, and carriers for food odors and flavors, and then cooling the mixture while maintaining the vacuum.

7. A process for preparing shortening which comprises heating a mixture including a major proportion of steam lard and minor proportions of edible beef tallow and lard flakes for a period of approximately one hour in a vacuum to raise the temperature to approximately 475 degrees F., holding the mixture at a temperature of between 425 and 475 degrees F. for approximately one additional hour while agitating with steam, and then cooling the mixture while maintaining the vacuum.

8. A process for preparing shortening which comprises heating a mixture including approximately 20% edible beef tallow and from 6½% to 7½% lard flakes, the remainder being substantially all steam lard for a period of approximately one hour in a vacuum to raise the temperature to approximately 475 degrees F., holding the mixture at a temperature between 425 and 475 degrees F. for approximately one additional hour while agitating with steam, and then cooling the mixture while maintaining the vacuum.

9. A bland substantially odorless shortening having a smoke point of approximately 465 degrees F. and characterized by substantial freedom from free fatty acids, odor-bearing materials, and carriers for food odors and flavors.

10. A bland substantially odorless shortening of animal origin having a smoke point of approximately 465 degrees F. and characterized by substantial freedom of free fatty acids, odor-bearing materials, and carriers for food odors and flavors.

11. A bland substantially odorless shortening formed from a mixture including from 15% to 25% edible beef tallow and 6½% to 7½% lard flakes, the rest being substantially all steam lard, all percentages being by weight, said shortening having a smoke point of approximately 465 degrees F. and characterized by substantial freedom of free fatty acids, odor-bearing materials, and carriers for food odors and flavors.

12. A bland substantially odorless shortening formed from a mixture including approximately 20% edible beef tallow and 6½% to 7½% lard flakes, the rest being substantially all steam lard, all percentages being by weight, said shortening having a smoke point of approximately 465 degrees F. and characterized by substantial freedom of free fatty acids, odor-bearing materials, and carriers for food odors and flavors.

13. A process for preparing shortening which comprises heating a mixture consisting of a major proportion of steam lard and minor proportions of tallow and lard flakes in a first stage to a temperature of approximately 355 degrees F. while agitating with steam, heating the mixture in a second stage to a temperature of approximately 475 degrees F., holding the mixture in a third stage at a temperature above approximately 450 degrees F. while agitating the mixture with steam, holding the mixture in a fourth stage at a temperature above approximately 425 degrees F. while agitating the mixture with steam, whereby the mixture is substantially freed of free fatty acids, odor-bearing materials, and carriers for food odors and flavors, the mixture being held under a vacuum in all stages, the mixture remaining in each stage approximately 30 minutes, and then cooling the mixture while maintaining the vacuum.

14. A process for preparing shortening which comprises heating a mixture consisting of a major proportion of steam lard and minor proportions of tallow and lard flakes in a first stage to a temperature of approximately 355 degrees F. while agitating with steam, heating the mixture in a second stage to a temperature of approximately 475 degrees F., holding the mixture in a third stage at a temperature above approximately 450 degrees F. while agitating the mixture with steam, holding the mixture in a fourth stage at a temperature above approximately 425 degrees F. while agitating the mixture with steam, whereby the mixture is substantially freed of free fatty acids, odor bearing materials, and carriers for food odors and flavors, the mixture being held under a vacuum in all stages, the mixture being agitated with steam in each stage, the major proportion of the steam being introduced in the third and fourth stages, the mixture remaining in each stage approximately thirty minutes, and then cooling the mixture while maintaining the vacuum.

15. A process for preparing shortening which comprises heating a mixture consisting of a major proportion of steam lard and minor proportions of tallow and lard flakes in a first stage to a temperature of approximately 355 degrees F. while agitating with steam, heating the mixture in a second stage to a temperature of approximately 475 degrees F., holding the mixture in a third stage at a temperature above approximately 450 degrees F. while agitating the mixture with steam, holding the mixture in a fourth stage at a temperature above approximately 425 degrees F. while agitating the mixture with steam, whereby the mixture is substantially freed of free fatty acids, odor bearing materials, and carriers for food odors and flavors, the mixture being held under a vacuum in all stages, the mixture being agitated with steam in each stage, the steam being introduced into each of the third and fourth stages at a rate of approximately 60 lbs. of steam per ton of batch during the thirty minutes the batch is in each of the third and fourth stages, the mixture remaining in each stage approximately thirty minutes, and then cooling the mixture while maintaining the vacuum.

16. A process for preparing shortening which comprises heating a mixture including approximately 20% beef tallow and from 6½% to 7½% lard flakes, the remainder being substantially all steam lard, all percentages being by weight, in a first stage to a temperature of approximately 355 degrees F. while agitating with steam, heating the mixture in a second stage to a temperature of approximately 475 degrees F., holding the mixture in a third stage at a temperature above 450 degrees F. while agitating the mixture with steam, holding the mixture in a fourth stage at a temperature above 425 degrees F. while agitating the mixture with steam, and cooling the mixture in a fifth stage, the mixture being held under a vacuum in all stages, the mixture remaining in each stage approximately 30 minutes, whereby the mixture is substantially freed of free fatty acids, odor-bearing materials, and carriers for food odors and flavors.

EDWARD G. ANDERSON.

REFERENCES CITED

The following references are of record in the file of this patent:

UNITED STATES PATENTS

| Number | Name | Date |
| --- | --- | --- |
| 2,407,616 | Phelps et al. | Sept. 10, 1946 |

OTHER REFERENCES

"Lard Takes on New Properties," by Frank C. Vibrans—Food Industries, June 1948—pages 94–97 (vol. pages 855–858).